Oct. 31, 1950     J. D. STACK     2,527,661
ELECTRIC COUNTER

Filed July 10, 1948     2 Sheets-Sheet 1

INVENTOR.
John D. Stack.
BY
*Robt L. Gunn*
ATTORNEY.

Oct. 31, 1950  J. D. STACK  2,527,661
ELECTRIC COUNTER
Filed July 10, 1948  2 Sheets-Sheet 2

INVENTOR.
John D. Stack.
BY
ATTORNEY.

Patented Oct. 31, 1950

2,527,661

UNITED STATES PATENT OFFICE 2,527,661

ELECTRIC COUNTER

John David Stack, Van Nuys, Calif., assignor to Twentieth Century-Fox Film Corporation, Los Angeles, Calif., a corporation of New York Application July 10, 1948, Serial No. 38,109

2 Claims. (Cl. 235—92)

This invention relates to counters and deals particularly with a counter adapted to be electrically operated.

The counter to be described and claimed hereinafter has been developed to meet a peculiar requirement in the motion picture industry. Its particular use in this respect is to visually indicate film footage to an operator or to an audience viewing a motion picture on a screen which footage corresponds to the projection footage of the picture upon the screen. In order to do this it was necessary that a fairly large counter be developed which was capable of remote control, that is, a counter for this purpose should be large enough to be viewed the length of a review room since it was more convenient to set such a counter near the screen and at the same time it should be capable of being actuated by means on the projection machine. One of the objects, therefore, of this invention is to provide a counter having numerals that can be seen visually at a considerable distance, wherein the means for actuating the mechanism of the counter is electrically operated and remotely controlled.

Another object of this invention is the provision of a counter of the character described having means for electrically resetting the counter so that an initial starting point may be obtained at any time.

Another object is to provide electrical means for transferring the accumulated total on one counter wheel to the next higher wheel.

In addition, it is a purpose of the invention to also have the resetting means electrically and remotely controlled.

And, finally, it is an object of this invention to provide an electrical counter of the character described having relatively few moving parts, of inexpensive construction, and comprising simple electrical expedients, all of which are well-known in the electrical art.

Other objects and advantages will become apparent as the description proceeds in conjunction with the drawings in which.

Figure 1:
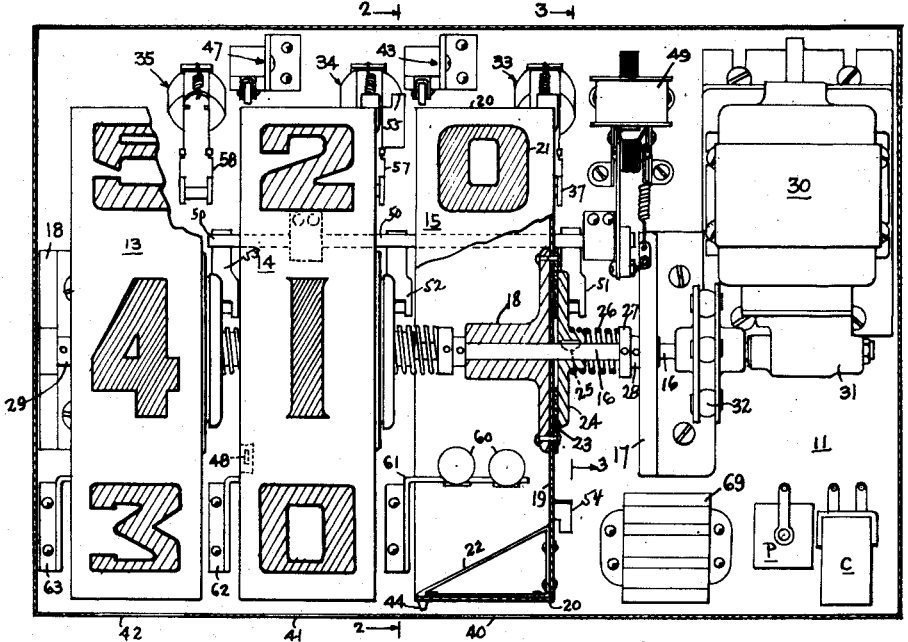
Figure 1 is a top plan view partly in section showing a comprehensive working arrangement of the parts embodied in my invention.

Briefly stated, the invention amounts to a counter for indicating the footage of film run through a projection machine. The counter, as before stated, is ordinarily used in the vicinity of the screen of a projection room or theatre and should be large enough to be seen the length of the room. Means for controlling the counter are situated on the projector machine and consist, broadly speaking, of a cam or a device of any sort which will open or close a suitable switch at predetermined intervals, which in the case of the motion picture use correspond to film footage.

The counter itself consists essentially of a base plate 11 having a casing 12 suitably mounted thereon. Enclosed within the casing and mounted upon the base plate are the devices which go to make up the counter and which will be designated and described. Before going into a detailed description of the means embodied in the counter, it might first be stated that the principle of the counter is based upon the use of a continuous revolving shaft having counter wheels loosely mounted thereon. Between the counter wheels and the shaft there is a friction clutch which tends to rotate the counter wheels with the shaft. In conjunction with this arrangement I employ detents which hold each counter wheel in a fixed position against turning so that a numeral or other desired indicia will show through the proper window. To change the numbers on one of the counter wheels, it is merely a matter of releasing the detent long enough to allow the counter wheel to rotate in response to the clutch when it is again stopped by the detent in a consecutive position. In this case the detent is an electrically operated solenoid which is operated from the projector machine. The counter wheel is built upon this theory of operation and the transference of the accumulated total of one wheel to the next higher wheel is accomplished in much the same manner. The resetting of all the wheels is likewise accomplished in a similar manner. With this in mind, a detailed description of the parts employed will now be entered.

As shown, the counter in this particular instance employs three counter wheels, 13, 14 and 15. There could be more wheels if desired but in this case, since the total was not intended to reach more than a thousand, three wheels were sufficient. Each of these wheels is loosely mounted upon a shaft 16 which is carried in bracket supports 17 and 18, in turn mounted upon the base 11. Since the wheels themselves are identical, a description of one will serve for a description of all. Referring to the counter wheel 15 for descriptive purposes, it is pointed out that this wheel comprises a hub 19 loosely arranged on the shaft 16. Suitably mounted on the hub 18 is a circular disk 19 which carries on the outer circumference a member 20 that may be of any suitable translucent material, upon which could be mounted numerals or indicia such as 21. The only requirement in this respect is that either the indicia transmit light with a dark background or that it occludes light with a light background. The means for mounting this band of material 20 can take any form and I have shown brackets 22 for this purpose. On the outer face of the disk 19 I mount a frictional ring member 23 which is suitably attached thereto in any manner satisfactory for the purpose. Bearing against the member 23 is a clutch member 24 that is slidably fixed to the shaft 16 by a key 25 and is yieldingly pressed against the member 23 by a spring 26 which bears against a collar 27 that in turn is fixed to the shaft 16 in any suitable manner, such as by a set screw. The shaft 16 is held against movement longitudinally by a collar 28 fixed thereto by a set screw, which collar bears against the supporting bracket 17. On the opposite end of the shaft 16 I mount another collar 29 in the same manner, which bears against the bracket 18. Under this arrangement the shaft 16 is free to turn in its bearings but is held against longitudinal movement in either direction. Under working conditions the shaft 16 is continuously rotating and carries with it the clutch member 24. Since this member is yieldingly bearing against the friction member 23, the tendency of the wheel 15 is to rotate with the shaft. The means for rotating the shaft comprises a motor generally designated 30 which is suitably mounted upon the base plate 11 and geared to the shaft 16 through any conventional gear reduction box 31 and a flexible coupling 32.

Figure 2:
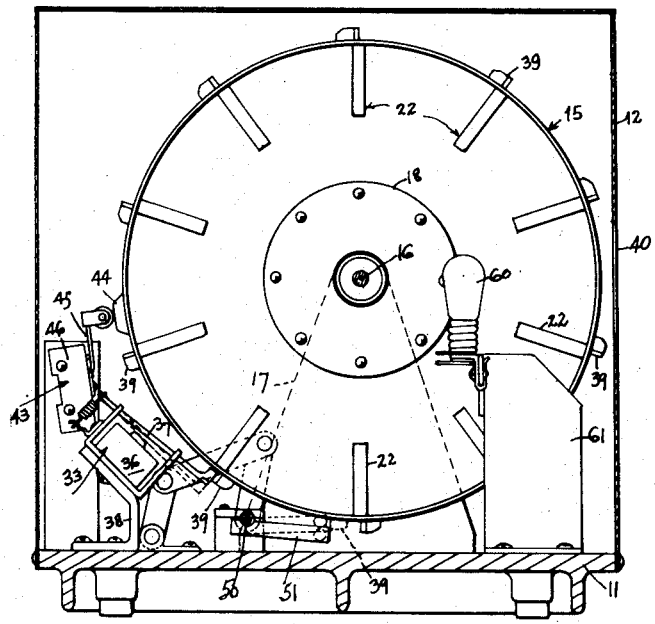
Figure 2 is a cross-sectional view taken on line 2—2 of Figure 1.

The means for holding the wheels 13, 14 and 15 against rotation are solenoid arrangements generally designated 33, 34 and 35 respectively. One of these means is best seen in Figure 2. Here it will be observed the solenoid 33 consists of a coil 36 having an armature 37 workably arranged thereover. The coil 36 is mounted upon the bracket 38 so that it holds the arm 37 in a position whereby the outer end of the armature engages a lug 39 on the perimeter of the counting wheel 15. It will be noted that there are a plurality of these lugs and in practice they are arranged so that each lug when engaged by the arm 37 will hold a numeral on the member 20 in fixed position for viewing through a window 40 in the casing 12. In this respect there are three such windows, namely, 40, 41, and 42, associated with the wheels 15, 14 and 13 respectively. From the foregoing it becomes evident that upon release of the detent arm 37 the counter wheel 15 will revolve in response to the rotation of the shaft 16 and will again be stopped in the next position by the detent arm 37 returning to its normal position and engaging the next lug 39. The coil 36 is actuated through an electrical circuit, which in turn is energized through the closing of a switch mounted upon a projector machine, and since the counter wheel rotates only a few degrees in response to each closing of the switch, it becomes a means of accumulating a total of such occurrences which are represented by numbers on the face of the wheel.

In conjunction with the foregoing, it is necessary to transfer the accumulated total from the wheel 15 to the wheel 14 when the wheel 15 has accumulated ten events. For this purpose I have provided a switch arrangement generally designated 43. Normally this switch remains open but is closed when a lug 44 mounted upon the periphery of the counter wheel 20 engages a roller mounted on the end of an arm 45, which arm in turn closes a microswitch 46. The closing of this switch operates to transfer the accumulated total of ten to the next higher wheel, which will be explained more fully in connection with Figure 4.

With respect to wheel 14, I have provided a similar arrangement generally designated 47 which is adapted to be closed by a lug 48 similar to the lug 44. Since there is no higher wheel above 13, there is no need for a transferring arrangement here; consequently, there is no switch shown in connection with this wheel.

There remains to be described an arrangement for resetting the counter so that all wheels will start from zero or any other initial starting point desired. For this purpose I have provided an arrangement whereby the detent arms of the solenoids 33, 34 and 35 are all withdrawn so that all the wheels are free to rotate. Simultaneously with this operation another solenoid 49 operates to turn a shaft 50 which swings detent arms 51, 52 and 53 into position so that they will engage lugs 54, 55 and 56 mounted upon the wheels 15, 14 and 13 respectively. The location of these lugs is so positioned that all wheels will be stopped at any point desired or, as in the case of counting, at zero positions. It is to be understood that the operator holds the switch closed until all the counter wheels are reset and that as soon as he opens the switch the arms 51, 52 and 53 automatically fall back into normal position where they do not interfere with the rotation of the wheels. However, at this point the regular detent arrangements, consisting of the solenoid arrangements 33, 34 and 35, are again operative and the arms 37, 57 and 58 associated with the said armatures again go back into position so that the wheels are detained against further rotating with the shaft 16 and are ready for operation.

As a means of furnishing illumination internally so that the indicia may be more easily read, I may provide lamps 60 mounted upon a bracket 61, so held that they will furnish illumination internally of the wheel 20. It is to be understood that there are three of these such brackets, namely, 61, 62 and 63, associated with the wheels 15, 14 and 13 respectively.

Figure 4:
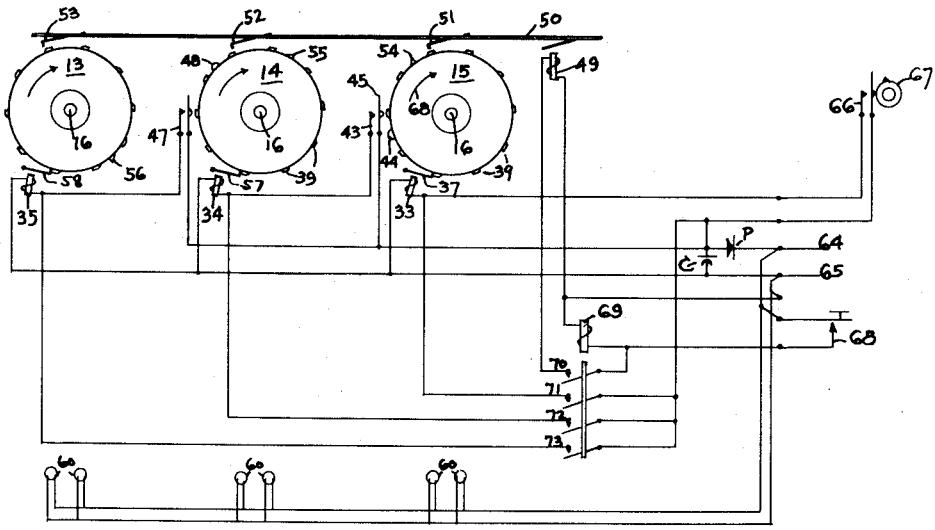
Figure 4 is a schematic arrangement showing an electrical circuit which may be used in conjunction with the moving parts of my invention which are more or less diagrammatically shown.
Figure 3:
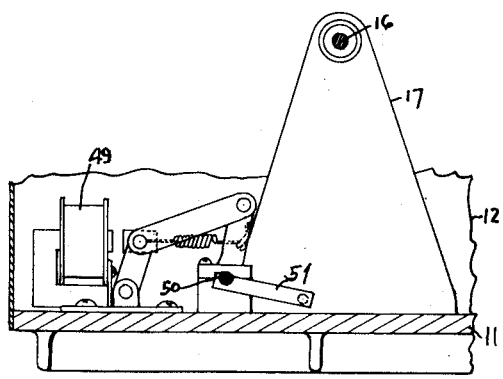
Figure 3 is a fragmentary cross-sectional view of Figure 1 taken on line 3—3.

To operate the device, reference may be had to Figure 4, wherein I have shown a schematic diagram of an electrical circuit in combination with the mechanical parts of my invention. The same numbers will be used throughout to identify the parts. Here it will be observed that the three counter wheels, 13, 14 and 15 are all shown with their attendant mechanism which is electrically connected. Since the device is intended to be operated in conjunction with electrical apparatus which ordinarily is driven by 110 A. C., I have shown the electrical circuit as being provided with 110 A. C. through conductors 64 and 65. This will provide the energy for the entire device. As shown, the solenoid 33 works through a filtered circuit comprising a condenser C and a rectifier P which is supplied with current by the conductors 64 and 65 and is controlled by a switch 66. In this case the switch 66 is operated by a cam arrangement 67, which for my purpose is located upon a projector machine on any suitable rotating parts that will close the switch at intervals proportional to film footage passing through the machine. As the switch is closed by the rotation of the cam 67, the solenoid 33 is energized and withdraws the arm 37. This releases the detent holding the wheel 15 against rotation and the wheel immediately rotates with the shaft 16 in the direction of the arrow 68. Before the next lug 39 passes the arm 37, the arm 37 has returned to its normal position and is again ready to hold the wheel in a new position, the new position corresponding to a change in numbers. This operation continues until the lug 44 engages the arm 45 of the switch 43 and closes the same. This occurs at the point where the wheel 15 has accumulated ten digits and is transferring its accumulated total to the next higher wheel. The closing of the switch 43 energizes the solenoid 34 and the action of the solenoid 34 is identical with the action of the solenoid 33 which has been previously described. The result is that the wheel 14 is turned to indicate an increase of one digit. As the wheel 14 accumulates ten digits, it in turn transfers its accumulated total to the wheel 13 in identically the same manner as described with respect to wheel 15. Here the lug 48 closes the switch 47, which in turn energizes solenoid 35 that releases the wheel 13 to indicate a next higher number. From the foregoing it can be seen that the opening and closing of the switch 66 permits the counter wheel 15 to accumulate a total in accordance with the number of times the switch is closed and that this total may be transferred from one wheel to the next higher wheel until an accumulated total may be shown on the three wheels represented in the device.

To reset the device, a switch 68 is used which may be hand-operated by the operator. Upon closing the switch 68, it is evident that solenoid 69 is actuated, which in turn closes a four-pole switch having poles 70, 71, 72 and 73. Pole 70 closes the circuit to solenoid 48, which in turn rotates the shaft 50 so that arms 51, 52 and 53 are brought into position to engage lugs 54, 55 and 56 on the wheels 15, 14 and 13 respectively. At the same time poles 71, 72 and 73 close circuits for solenoids 33, 34 and 35 respectively. These solenoids being energized, withdraw the armatures associated therewith and allow the wheels 15, 14 and 13 to rotate until they are stopped by the arms 51, 52 and 53 engaging the lugs 54, 55 and 56 respectively. At this point the counter wheels are set at the initial starting point and are held there until the switch 68 is released, whereupon the solenoids 33, 34 and 35 release their armatures, which are spring impelled, and snap back into the detent position, thereby holding the wheels against further rotation. It might be mentioned here that since there is a slight interval between the release of the detent arms 51, 52 and 53 and the engaging of the detent arms 37, 57 and 58, there should be a slight spacing of the detent arms 37, 57 and 58 around the periphery of the counters with respect to the arms 51, 52 and 53 so that they would be allowed sufficient time to get into position to engage the next succeeding lug 39, after release of the resetting mechanism.

In practice it has been found that the device when used at the base of a projection screen works satisfactorily to visually indicate film footage. Although this description has been directed to a more or less definite construction, it is not the intention to limit the invention to this specific construction since there may be cases where common expedients can be substituted which in no wise would alter the invention. Accordingly, it is the intention to include in this invention all such modifications and refinements that may be made in the device without departing from the scope of the claims appended hereto.

I claim:

1. An electrical counter comprising a plurality of counter wheels loosely mounted on a rotatable shaft, means for slippably rotating said wheels by said shaft, an electrically releasable detent associated with each of said wheels for holding the same against rotation, remotely controlled means for intermittently releasing one of said detents, means cooperating between adjacent counter wheels for intermittently releasing the other said detents at predetermined points of rotation of their respective cooperating wheels, a second electrically operated detent associated with each of said counter wheels, said second detent being normally inoperative, and electrical means for simultaneously releasing all of said first mentioned detents to permit free rotation of said counter wheels and moving all of said second detents into operative position to hold all of said counter wheels fixed against rotation by said shaft at predetermined positions.

2. An electrical counter comprising a plurality of counter wheels loosely mounted on a rotatable shaft, means for slippably rotating said wheels by said shaft, an electrically releasable detent associated with each of said wheels for holding the same against rotation, remotely controlled means for intermittently releasing one of said detents, means cooperating between adjacent counter wheels for intermittently releasing the other said detents at predetermined points of rotation of their respective cooperating wheels, a second electrically operated detent associated with each of said counter wheels, said second detent being normally inoperative, and remotely controlled means for optionally and simultaneously releasing all of said first mentioned detents to permit free rotation of said counter wheels and moving all of said second detents into operative positions to hold all of said counter wheels fixed against rotation by said shaft in predetermined positions.

JOHN DAVID STACK.

REFERENCES CITED

The following references are of record in the file of this patent:

UNITED STATES PATENTS

| Number | Name | Date |
|---|---|---|
| 926,151 | Vincent | June 29, 1909 |
| 1,447,871 | Lake | Mar. 6, 1923 |
| 1,830,756 | Ford | Nov. 10, 1931 |

FOREIGN PATENTS

| Number | Country | Date |
|---|---|---|
| 632,525 | France | Oct. 10, 1927 |